(No Model.) 5 Sheets—Sheet 1.

J. H. MYERS.
VOTING MACHINE.

No. 494,588. Patented Apr. 4, 1893.

Witnesses
Thomas Durant
Bernard Werle

Inventor
Jacob H. Myers,
by Church & Church
his Attys

(No Model.) 5 Sheets—Sheet 2.

J. H. MYERS.
VOTING MACHINE.

No. 494,588. Patented Apr. 4, 1893.

Witnesses
Thomas Durant
Bernard Werle

Inventor
Jacob H. Myers
by Church & Church
his Attys (No Model.) 5 Sheets—Sheet 3.

J. H. MYERS.
VOTING MACHINE.

No. 494,588. Patented Apr. 4, 1893.

Witnesses
Thomas Durant
Bernard Weile

Inventor
Jacob H. Myers
by Church & Church
his Atty (No Model.) 5 Sheets—Sheet 4.

J. H. MYERS.
VOTING MACHINE.

No. 494,588. Patented Apr. 4, 1893.

Witnesses
Thomas Durant
Bernard Werle

Inventor
Jacob H. Myers
by Church & Church
his Attys (No Model.) 5 Sheets—Sheet 5.

J. H. MYERS.
VOTING MACHINE.

No. 494,588. Patented Apr. 4, 1893.

Witnesses
Thomas Durant
Bernard Werle

Inventor
Jacob H. Myers
by Church & Church
his Attys

UNITED STATES PATENT OFFICE.

JACOB H. MYERS, OF ROCHESTER, NEW YORK.

VOTING-MACHINE.

SPECIFICATION forming part of Letters Patent No. 494,588, dated April 4, 1893.

Application filed August 23, 1892. Serial No. 443,884. (No model.)

*To all whom it may concern:*

Be it known that I, JACOB H. MYERS, of Rochester, in the county of Monroe and State of New York, have invented certain new and useful Improvements in Voting-Machines; and I do hereby declare the following to be a full, clear, and exact description of the same, reference being had to the accompanying drawings, forming a part of this specification, and to the figures and letters of reference marked thereon.

My present invention relates particularly to that class of voting or balloting machines illustrated in my prior patents Nos. 415,549 and 424,332, though parts are capable of use elsewhere, and it has for its object to improve the construction and operation of various parts of said machines, whereby their capabilities are increased and certain alleged objections are overcome, and to these and other ends the invention consists in certain novelties in construction and combinations of parts all as will be hereinafter fully described and the novel features pointed out in the claims at the end of this specification.

The machine in which my present inventions are illustrated herein embodies the same general features shown in the prior patents referred to, that is, a booth or chamber containing the operating parts, which the voter enters to indicate his choice of candidates, balloting devices, which after being operated become locked until the voter leaves the booth or chamber, and releasing mechanism actuated when he leaves the chamber to restore the parts to normal position ready for another voter.

Though the improvements herein described relate particularly to this class of machines, it will be readily understood that some of them can be employed in other connections and I do not therefore desire to be confined to precisely the arrangements shown.

In the drawings: Fig. 20 a side elevation of the same with the support partly in section; Fig. 21 a vertical sectional view; Fig. 22 a rear view, and Fig. 23 a plan view of the attachment with the supporting casing partly in section.

Similar reference numerals and letters in the several figures indicate similar parts.

Figure 4:
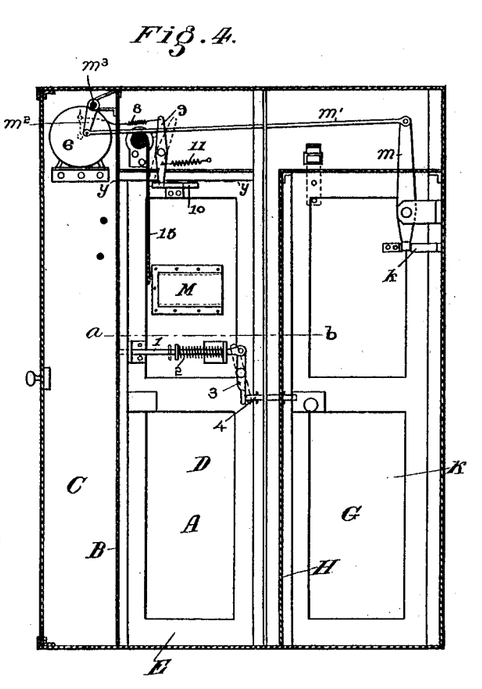
Fig. 4 a vertical sectional view through the booth or chamber taken on the line $x$—$x$ of Fig. 8.
Figure 7:
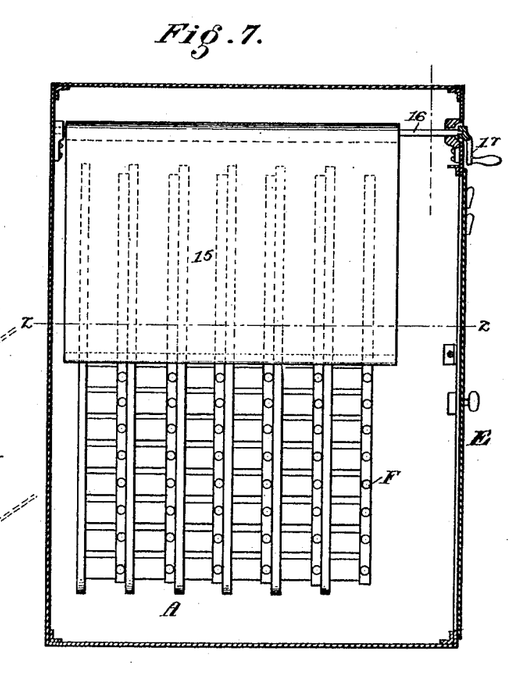
Fig. 7 a vertical sectional view of the booth looking toward the balloting devices.
Figure 8:
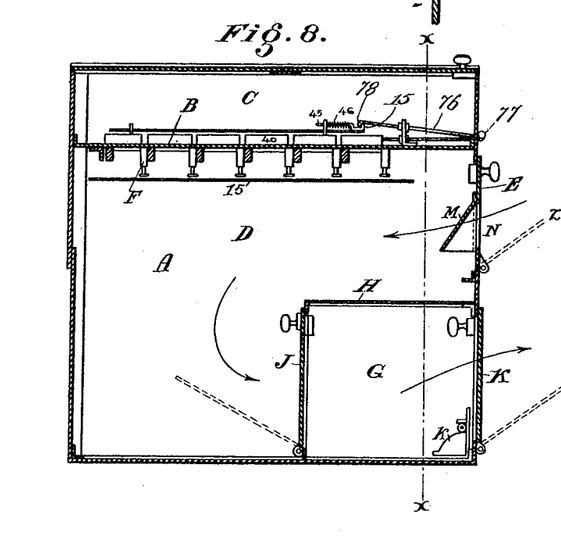
Fig. 8 a horizontal sectional view of the booth taken on the line $z$—$z$ of Fig. 7.
Figure 9:
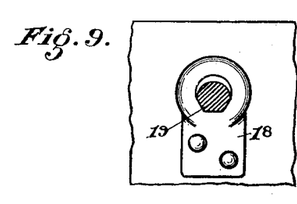
Figs. 9 and 10 sectional views illustrating details.
Figure 10:
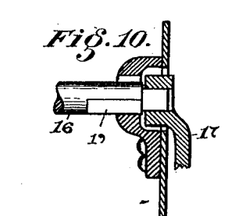

Referring particularly to Figs. 4, 7 and 8, A indicates the booth or chamber containing the operating parts preferably constructed of metal of suitable thickness formed in sections adapted to be bolted together and capable of being readily taken apart and stored or of being set up in a room where the election is to be held. Extending across this chamber is a partition or wall B dividing the booth into compartments or chambers, the one C containing the counting and operating mechanism, acessible only to the judges and inspectors of election. The other compartment D is accessible to the voter through the usual entrance door E. Inside the booth is a compartment G formed by a partition H and an interior door J, the exit door K from the chamber opening from this compartment G, and suitable interlocking devices, such as shown in my patent No. 424,332 for instance, are arranged between the doors J and K and between the door K and the operating devices, so that the latter door cannot be opened from the interior until the door J is closed and locked, thereby preventing the voter after he has cast his ballot from returning to the chamber D, and also providing for the release of the balloting devices, when the door K is opened, so that they may be actuated by the next voter passing into the booth through the door E. Arranged upon the door K is the cam $k$ operating on the end of a lever $m$, which through the rod $m'$ and crank $m^2$ actuates the shaft $m^3$ located in the chamber C for the purpose of releasing the balloting mechanism, as in my before mentioned patent.

Figures 15, 16, 17, 18:
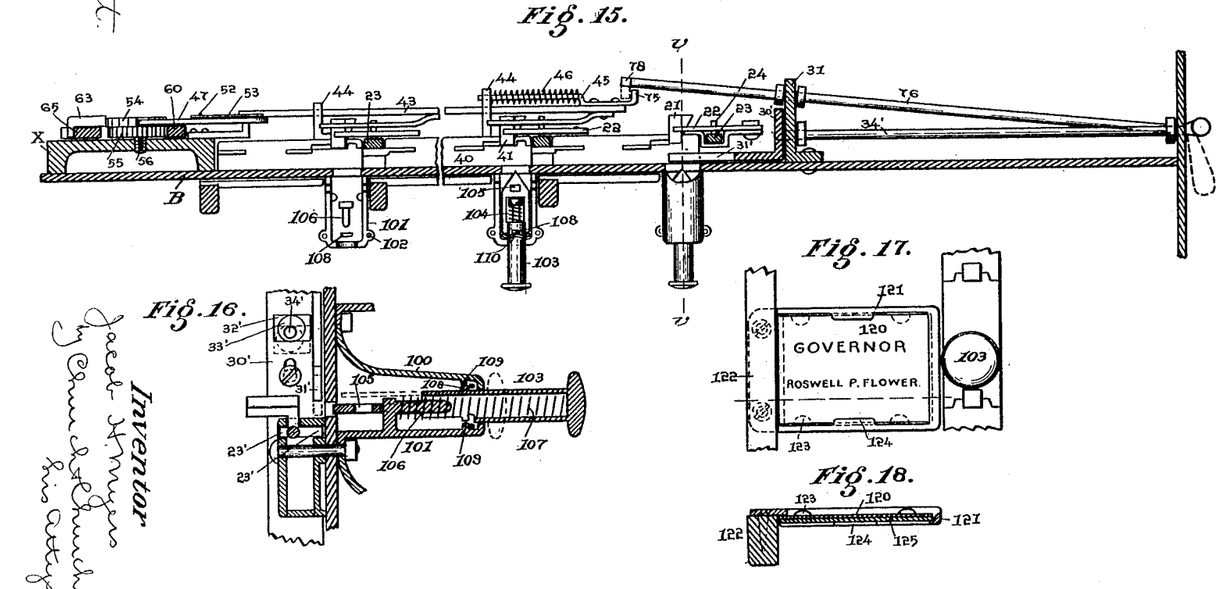
Fig. 15 a sectional view on the line $g$—$h$ of Fig. 1.
Fig. 16 a vertical section on the line $v$—$v$ of Fig. 15.
Figs. 17 and 18 front and sectional views of the push key and name plate.

The balloting indicating devices are push keys located in the chamber D and accessible to the voter and are indicated by F in Fig. 7 and may be constructed as shown in the patent, but preferably as shown in Figs. 15, 16 and 17 and hereinafter described, and in order to prevent the opening of the entrance door E while the exit door K is slightly open and before the push keys have returned to their normal position I provide interlocking mechanism between said entrance and exit doors, consisting in the present instance, of a bolt 1 arranged to be projected by a spring 2 to lock said entrance door by engaging with the jamb or inside of the casing; said bolt being pivoted at one end to a small lever 3 against the other end of which a slide 4 projects; said slide passing in proximity to the door K through the partition H and adapted to engage a beveled projection 5 arranged in proximity to the lock on said door; the arrangement being such that when the door K is closed the projection 5 will push in the bolt 4 and through the lever 3, the bolt 1 will be retracted against its spring, unlocking the door E, but when said door K is opened, the spring 2 will throw out the bolt 1 and lock the door E until the door K is closed again. See Figs. 4 and 11. By this means it is impossible for the door-keeper or any one outside of the booth to ascertain which of the ballot keys have been operated, by opening the door E and looking in before the voter has left the booth and closed the door K behind him.

Figures 3, 5, 6, 11, 12, 13:
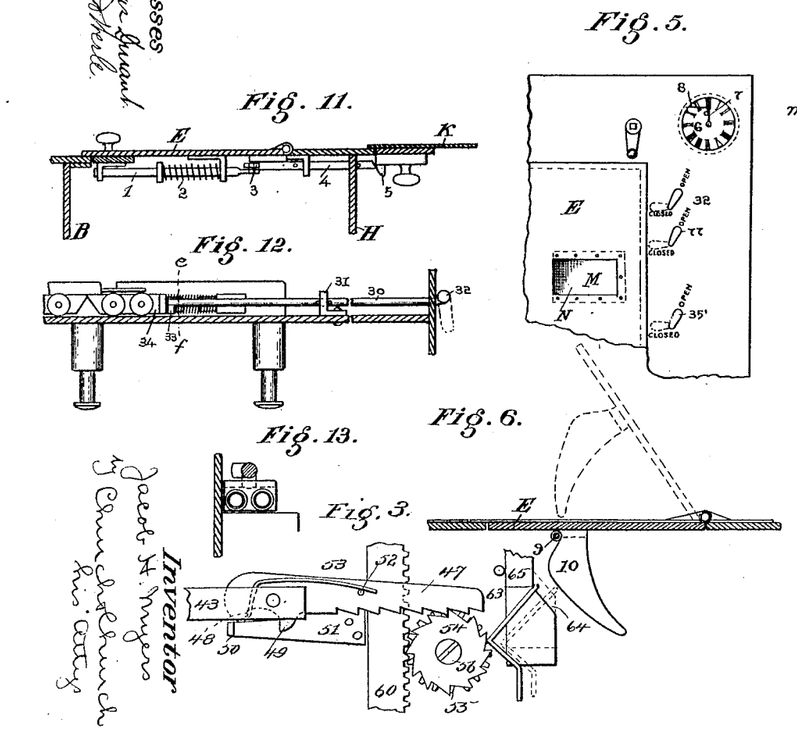
Fig. 5 an elevation of one corner of the booth or casing showing the entrance door.
Fig. 6 a sectional view on the line $y$—$y$ of Fig. 4.
Fig. 11 a sectional view on the line $a$—$b$ of Fig. 4.
Fig. 12 a sectional view on the line $c$—$d$ of Fig. 1.
Fig. 13 a sectional view on the line $e$—$f$ of Fig. 12.

In the practical operation of my improved machine it has been found desirable to limit the time that a voter may remain in the booth and in order that this may be accurately determined without dispute, I provide a clock or timing mechanism which is preferably continuously running, but the indicating hand of which is set back to zero each time the entrance door to the booth is closed; this arrangement being shown particularly in Figs. 4 and 5, in which 6 indicates a clock preferably located within the booth and having its face visible from the exterior; said clock having but a single hand 7 connected by a flexible connection 8, preferably embodying a spring, with one end of a lever 9 pivoted to the casing and having its lower end arranged in proximity to a cam 10 located on the door E, as shown in Figs. 4 and 6, the end of the lever being held by a spring 11 normally in contact with said cam and the construction being such that when the door E is opened and closed by the voter entering the booth, the lever 9 is moved over to the position shown in dotted lines Fig. 4 and the hand of the clock is drawn back to zero, or as shown, to XII, and the time allowed the voter within the booth is always measured from a determinate point thus avoiding the necessity of calculation. The connection between the hand of the clock and the running mechanism is preferably a loose or frictional one so that the hand can be returned to zero without materially interfering with its proper operation, and the latitude of movement allowed it is preferably slightly greater than the longest time that a voter is allowed within in the booth.

In the event that it is necessary for an officer to enter the booth to eject an unruly or dilatory voter it is desirable that he be prevented from ascertaining what the votes or ballots, if any, cast by the voter are, I provide a flexible curtain 15 adapted to be wound upon a shaft 16 journaled in suitable bearings in the frame; said curtain extending over the ballot push keys F, so as to effectually hide them from view from within the booth. The end of the shaft extends out through the casing and is provided with a squared end to which a crank 17 is adapted to be applied, and one of the bearings 18, in which the end of the shaft is mounted, has an angular seat in its lower side with which an angular portion 19 of said shaft co-operates, so that when the curtain is entirely wound upon the shaft the latter will be maintained in position by the co-operating angular surfaces, but when it is desired to lower the curtain it is only necessary to apply and operate the crank and allow the curtain to unroll. Other suitable retaining devices could be employed instead of those described if desired; but I prefer the latter on account of their simplicity.

The ballot push keys employed in the present machine resemble somewhat those shown in my prior patent No. 424,332 and are constructed as shown particularly in Figs. 15 and 16, the casings being made in two parts 100 and 101, the upper and lower parts of vertically adjacent key casings being fastened to the partition B by single bolts 102. The push keys proper consist of a hollow cylindrical body 103 having a head on the outer end, the inner end being preferably flat and pointed or beveled at the sides, as shown, for co-operating with the counter slide 21, and also provided with the slot 104 and aperture 105, which latter is adapted to be engaged by the retaining dogs or pawls 22. The lower part 101 of the key casing is provided with a vertical lug or arm having a lateral extension 106 over which the spring 107 is passed and by which it is retained and centered, the spring passing within the cylindrical body 103 of the key. This arrangement enables me to not only shorten the key but as well to employ a long spring and the cylindrical portion gives a broad bearing for the key making the structure more solid. The body or barrel of the key, near its middle, is provided with two or more lugs 108 and the parts of the casing are also provided with lugs or flanges 109 between which and the end of the casing is arranged a crimped ring or washer 110 somewhat elastic so that when the key is released this washer will operate as a buffer to check the outward movement of the key and prevent too much shock, when thrown outward by the spring 107. In Fig. 15 a plan of one of the key casings complete is shown, another with the top removed and the one to the left with the upper part of the casing and key removed.

Figure 14:
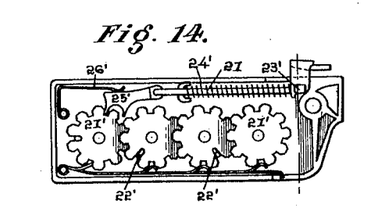
Fig. 14 a front view of one of the counters.

The keys devoted to candidates for the same office are arranged in the same horizontal line and interlocking devices are arranged between them to prevent the operation of more than one indicating a single vote in the same line. The counters 20 may be of any suitable construction, but I prefer to make them as shown in Fig. 14, embodying indicating wheels 21' preferably set at an angle to the case and having carrying teeth 22' engaging the teeth on the next succeeding wheel. The slide 21 is provided with the ears or lugs 23' operating in slots in the casing, is retracted by the spring 24' and carries at its outer end a double-toothed pawl 25' thrown in engagement with the teeth of one of the counter wheels or disks by a spring 26'.

Figure 1:
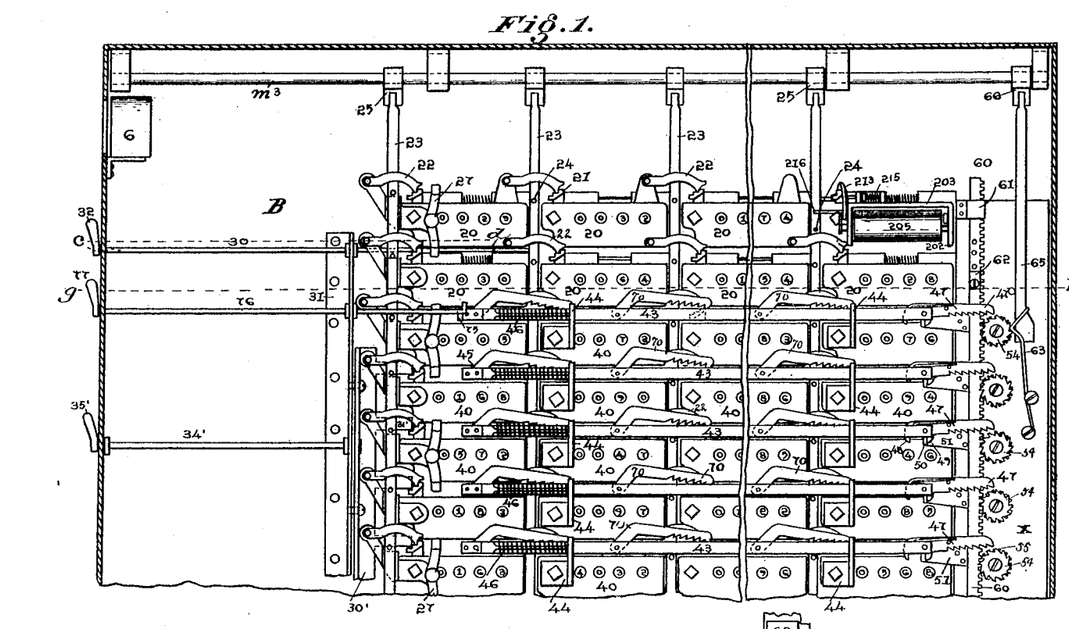
Figure 1 is a rear view of the partition carrying the operating devices.

All the counters and push keys are preferably the same and with the slides and keys are arranged to engage the retaining dogs or pawls 22 as in my previous patent; said retaining pawls being adapted to be released by a vertically moving rod 23 having the projection 24 thereon and connected by arms 25 with the shaft $m^3$, which is actuated by the exit door in the arrangement shown in Fig. 1.

The upper two rows of counters and actuating and releasing devices shown are of the above construction and the vertical row at the left is supposed to be devoted to questions for and against which a popular vote is desired, the pivoted levers 27 being adapted to co-operate at its ends with the slides 21 of adjacent counters, so that if the upper slide is actuated by the ballot push and a vote is registered "for," the lower end will be moved over against the lower slide and its operation will be prevented, substantially this arrangement having been described in my before mentioned patent. As these counters are usually devoted to questions of appropriations, it is desirable sometimes that non-taxed voters be not allowed to vote on them and for the purpose of enabling them to be locked from operation when desired, I arranged a sliding bar 30' preferably of angle iron on the partition B; said bar having a series of arms or projections 31' arranged normally above the key apertures, but capable of being moved down, so that said arms will project in line with the keys and prevent their inward movement, and in the present arrangement this movement is caused by forming a recess 32' in the bar, in which operates a cam or crank arm 33' see Fig. 16 on the end of a shaft 34' extending to the exterior of the booth where it is provided with a handle 35'; the arrangement being such that when the handle is raised, as in full lines, Fig. 5, the bar 30' is raised and the keys are released, but when in the position in dotted lines said bar is dropped and the keys in the column prevented from operation, as will be understood. This locking arrangement is only shown as applied to the lower end counters in Fig. 1 for the purpose of simplifying, but it is obvious that it is to be applied, if desired, to the whole vertical line.

Oftentimes it is desirable to lock the keys devoted to candidates for a particular office from operation to prevent persons not entitled from voting for such candidates and in order that this may be accomplished I provide a shaft 30 supported in a suitable bearing 31 and extending into the chamber C from the outside of the booth and locate a handle 32 on its outer end, while its inner end is provided with a web or hook 33 adapted to co-operate with one of the sliding blocks 34, forming a portion of the interlocking mechanism between the keys in the row devoted to this particular office, see Figs. 12 and 13, so that when the handle 32 is in the position termed "open" in Fig. 5, the sliding block 34 will not be acted upon by the hook 33 on the shaft and the normal operation of the keys can take place, but when said handle is turned down to the position shown in dotted lines in said figure, the hook will hold the block 34 stationary and prevent the operation of any of the keys in that row, in the same manner that the locking of the keys would be accomplished if one of them in the row were actuated to register a vote.

Figure 2:
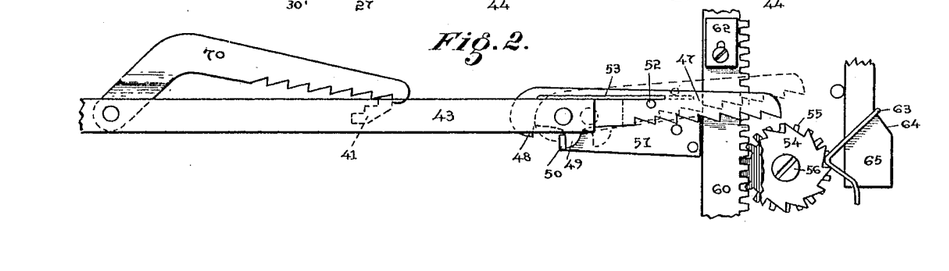
Figs. 2 and 3 are detail views of a portion of said mechanism.

When there are a number of the same offices to be filled and each party has several nominees, or when it is desired to permit what is termed "cumulative" voting, provision must be made for allowing each voter to cast as many ballots as he may be entitled to, whether for the same or different candidates, and no more, and in my before mentioned patent I have provided one means of accomplishing this result in which the voter is permitted to vote for any two of a number candidates. For the purpose, however, of increasing the capabilities of the machine and also of providing simple mechanism for accomplishing this and other results hereinafter described I prefer to use the mechanism shown in Figs. 1, 2, 3, and 15 in the drawings. In the present embodiment of this portion of my invention I have shown a construction in which there are presumed to be five candidates for the same office, nominated by each party, whether there be more than three parties or not, the counters of these candidates being indicated by 40 and being in all respects the same as the ones employed for the other candidates and each provided with a slide 41 corresponding to the slide 21 of the other counters and arranged to be actuated by ballot push keys in the same manner, the counters indicated being located in the five lower rows of those shown in the drawings excluding the vertical line of counters on the left, which, as before stated, are devoted to questions for and against which a popular vote is desired. Each of the horizontal lines of the counters 40 is provided with a longitudinally movable bar 43 supported in suitable guides or supports 44 arranged on the counters themselves, or on the partition B, each of these bars being provided with an arm 45 encircled by a spring 46 arranged between the shoulder on the arm and one of the guide plates 44, as shown in Fig. 15, and each operating to project said bars to the left, Fig. 1. To the outer (right hand) end of each of these bars is pivoted a pawl 47 provided with ratchet teeth on its under side, at its outer end, while its inner end is provided with two downwardly projecting arms or lugs 48, 49, on opposite sides of its pivot adapted to engage a lug 50 formed by the plate 51 secured to the partition B through a plate X, or one of the counter casings. A pin 52 is located on the pawl 47 and is adapted to be engaged by a spring 53 secured to the upper side of the said bar and in one position pressing down on the pin tending to press the teeth of the pawl into engagement with corresponding ratchet teeth formed on a wheel 54 secured to a pinion 55 and mounted upon a stud or screw 56 and in its other position below the pin, tending to raise said outer end and bring the lug 48 down in line with lug 50. The movement of the bars 43 to the left is arrested by the arm 49 on the pawl 47, which is the longer of the two, engaging the stop 50, thereby holding the pawl 47 out of engagement with the wheel 54, in the position shown in full lines in Figs. 1 and 2 against the tension of its spring 53. The gears 55 with which the pawls on the bars co-operate, mesh with the teeth of a vertically moving rack 60 arranged to move in suitable guides, with one of which 61, an adjustable stop 62 arranged on said bar is adapted to co-operate, to limit the longitudinal movement, and engaging with the ratchet wheel 54 of one of the series, is a spring 63 adapted to enter the space between the teeth on said wheel and hold it accurately in any position in which it may be moved; the outer end of said spring passing over the shoulder 64 on a vertically movable bar 65 connected by a crank 66 with the rock shaft $m^3$, the construction being such that when said rock shaft is operated and the bar 65 raised, the spring will be released from the ratchet wheels 54 and the bar 60 permitted to drop to its lowest or normal position.

Each of the bars 43 is provided with a pivoted pawl 70 having a series of teeth on its under side corresponding in number and size with those on the pawls 47, arranged to be engaged by the slide 41 of the counter to which it is devoted; said pawls 70 normally resting upon the slides 41 of the counters, and when the push keys devoted to these counters are actuated, the pawls and bars move to the right, the pawl 47 at the end of the bar being moved down into engagement with its co-operating wheel 54 as soon as the arm 49 leaves the projection 50, turning said wheel 54 and its connected gear and moving the rack bar 60 vertically a distance equal to one vote, for instance. When the slides 41 are actuated by the push keys, the retaining dogs 22 drop behind them and engaging the apertures 105 in the keys retain them both as described above and contained in my last mentioned patent. The pins 24 on the releasing rods 23 are arranged to co-operate with both the dogs 22 and pawls 70, so that the bars 43 may be returned to normal position by their springs 45 when the voter leaves the booth, the pawls 47 sliding back over the teeth on the wheels 54 without affecting the operation of the latter.

The proper designation of the push keys on the inside of the booth is accomplished by the employment of printed ballot cards 120 containing the candidates' names and held in metal frames 121 secured to the rear sides of bars or uprights 122 fastened to the front of the partition B. These frames 121 are provided with small lugs 123 on their rear sides and on the fronts with lugs 124, the space between said lugs being open at one end and sufficient for the accommodation of the card and a glass, or transparent cover 125; the open end of the frame is adapted to be closed by the bar 122 when secured to it, as in Fig. 18. The other end of the frame is close to the key casing and the removal of the card is prevented though the card can be slipped in between the rear lugs 123 and the transparent cover when the frames and bars are removed from the partition. The operation of this portion of my invention will now be readily understood from an inspection of Fig. 1. The parts being in the position shown in said figure that is, all of the ballot pushes are released and in operative position and all of the bars 43 are projected to the left and the pawls 47 are held out of engagement with their co-operating ratchet wheels. Assuming that the voter is entitled to vote for any five candidates, after entering the booth he operates one of the push keys, the end of which operates the slide 41 of the counter to the right in said figure and said slide carries with it the bar 43 of the line in which it is located being connected through the medium of the pivoted pawl 70 and when the inward movement of the key is completed it becomes locked, as before described, through the pawl or dog 22 which engages the aperture in the key and prevents the return of the counter slide 41 to first position. As soon as the bar starts to move, the arm 49 of the pawl 47 leaves the stop 50 and the pawl 47 is forced by its spring into engagement with its ratchet wheel 54 at the end and the continued movement caused by the movement of the slide 41 turns the ratchet wheel 54 the distance of one tooth and through the connected gear 55 raises the rack 60 a certain determinate distance. The voter now operates the other keys either in the same, or different lines, and the operation of one moves the bar 43 of the line in which it is, a determinate distance to the right, raises the rack 60 a corresponding distance until the whole number of votes to which the voter is entitled have been registered and counted, at which time the adjustable stop 62 on the rack 60 has come into engagement with the stop or guide 61 and all further movement of said rack is thereby prevented, so that should an attempt be made to cast another vote for any of the candidates, if it is a key operating on a bar 43 that has not been voted upon, the said bar will move only a sufficient distance to engage its pawl 47 with its appropriate ratchet wheel, but said wheel being engaged with the rack, and the rack being arrested, cannot turn, and therefore the key cannot be pushed a sufficient distance to register a vote on the counter, all of the slides 43 will be locked and the operation of any more keys prevented. After the first vote has been registered and the pawl 47 of any bar has been thrown into engagement with its ratchet wheel and a voter desires to vote for a candidate whose key is contained in a lower line, the first mentioned gear will be rotated and the pawl allowed to slip over the teeth of the ratchet. As the bars 43 are moved the distance of one tooth on the pawl 70 each time one of the counters is operated it will be seen that when said bar is moved by a counter slide the pawls will slip over the slides of the unoperated counters and the second tooth of each will become engaged with said slides and so on with all the counter slides connected by that particular bar, and as the pawls 70 each have one tooth more than the number of counters contained in that line and as the slides are locked after they have been moved, the proper number of votes only can be registered in that line as the movement of the bar will be arrested by the shoulder on the projection 45 coming into engagement with the bracket 44 after the appropriate number have been voted.

The spring 63 co-operating with the teeth of the upper wheel 55 serves to properly position both the wheels and the rack 60 being engaged between the teeth. After the voter has finished operating the push keys in the booth or chamber, if he has voted as many times as he is entitled to, he will be prevented from operating any more keys by the arrest of the rack bar 60 and he then leaves the booth, passing through the doors J and K, as before, operating the shaft $m^3$ when the latter door is opened raising the arms 25 and 66 through the mechanism described. The rods 23 connected to the arms 25 operate through the pins 24 to release the retaining dogs 22 co-operating with the keys and at the same time said pins co-operate with the pawls 70 on the sliding bars and raise them out of engagement with the counter slides, thereby permitting the springs 46 to retract all of said bars to the left in normal position. At the same time the bar 65 is raised and the spring arm 63 is, by means of the incline 64 on said bar, drawn out of engagement with the ratchet wheel 54 and the rack 60 allowed to drop to lowest, or normal position, this downward movement, if desired, being gradually arrested and the jar checked by means of a suitable spring buffer, or retarding device.

In order that the machine may be adapted for any number of candidates for the same office, the stop 62 is capable of adjustment on the rack 60, so that greater or less movement may be allowed the latter before the stop engages with the abutment or guide 61. The parts having now returned to normal position, another voter may be admitted to the booth and the same operation will take place as before.

In order that the push keys in the lines of counters actuated by the movable bars 43 may be locked to prevent the operation of any key in the line I arrange upon one end of said bars small hooks or projections 75, as shown in Figs. 8 and 15, and extend a shaft 76 through the front of the booth where it is provided with a handle 77; said shaft having on its inner end a hook 78 adapted when the handle on its outer end is turned to the position indicated in full lines Fig. 5, to be out of line with the hook 75 on the bar, but when turned to the position shown in dotted lines in said figure the hook will engage with the hook 75 on the sliding bar 43 and will prevent its movement. This is but one form of a bar locking device, which I have found to be convenient, but other equivalent means could be readily employed. When it is desired to use these sliding bars as a means connecting the several keys in a certain line and preventing the operation of more than one of them, it is only necessary to raise the pawls 47 on their outer ends and insert the spring 53 under the pin 52, thereby maintaining the pawls in the position shown in dotted lines Fig. 2, bringing the projection 48 on their inner end down into line with the stud 50 and maintaining it there so that the operation of any key in the line will move the bar 43 one unit to the right and its further movement will be arrested by the engagement of the arm 48 and the stop 50 and as the counter slides are connected through the pawls 70 with said bar, the movement of any other in that line will be prevented and the one first operated will be locked by the retaining dog 22. In the operation of the cumulative arrangement, previously described, it will be noted that the short arm 48 of the pawl 47 will move over the projection 50 without engaging it. Though I prefer, in many instances, to employ both the sliding block locking devices shown in my previous patent, it will be seen that the sliding bar arrangement herein shown is adapted by reason of the adjustment of the pawl 47, just described, to be applied to all the keys of the machine and by the use of this arrangement the construction of the parts is very much simplified and in some instances its use is preferable.

Figure 19:
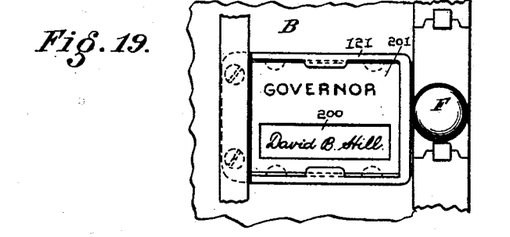
Fig. 19 is a front view of what I term an irregular voting attachment.
Figures 20, 21, 22, 23:
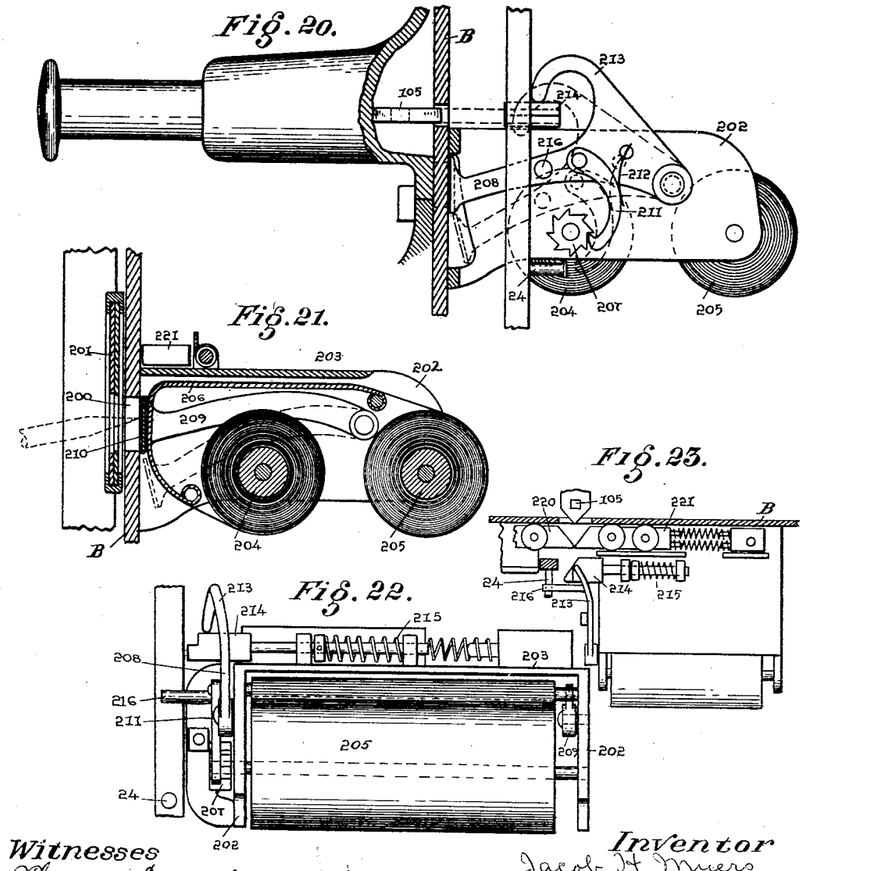

In order that persons not regular party nominees may be voted for and the same secrecy and security against fraud may be obtained that is possessed by the ballots cast by those voting the regular tickets, I provide means shown in detail in Figs. 19 to 23 and also in Fig. 1 at the upper right-hand corner. In carrying out this portion of my invention I form an aperture 200 in the partition B surrounded by a frame 121 containing the card having the office to which the device is devoted, as "Governor," printed thereon and held by the transparent plate 201 also having the aperture therein corresponding to the one in the card and partition. Secured to the rear side of the partition B is a frame consisting of side pieces 202, front piece 203 and top, and journaled in the sides of the frame are two rollers 204 and 205 to which are connected the ends of a continuous web or band of paper, said paper passing from one roller to the other, over a paper support 206, preferably of sheet metal, the portion of the paper in front of the support being directly behind the opening 200, so that it may be written upon by inserting a pencil through said aperture, as in dotted lines Fig. 21 or a paster may be attached. The roller 204 which I term the take-up roller is provided on one end with a ratchet wheel 207, and pivoted to the side pieces 202 of the frame are arms 208, 209, carrying at their outer ends a cover plate 210 arranged when the parts are in the raised position shown in full lines in Figs. 20 and 21 to come just in rear of the aperture 200 and to cover the paper web passing behind it. Pivoted to the arm 208 is a pawl 211 engaging the ratchet wheel 207 and adapted to be held in engagement by a spring 212 and the upper part of said arm 208 is provided with an extension 213 projecting over and forward and normally resting upon a sliding block 214 movable in suitable bearings and normally projected by a spring 215 into position under said extension. Secured to the front of the partition B is a key in all respects the same as the other ballot push keys having the inclined end and perforation 105, said key being adapted when pushed in to engage the block 214 move it back and permit the dropping of the cover plate from the aperture 200 and the engagement and retention of the key by the co-operation of the extension 213 with the aperture 105 therein, permitting the voter to write the name of the candidate for whom he desires to vote on the paper, the pencil being inserted through the aperture 200. An arm or extension 216 on the arm 208 projects outward and in position to be engaged by one of the pins 24 on the releasing rod 23 so that when said rod is raised the extension 213 will be raised and the key released and at the same time the pawl 211 will engage and rotate the winding roll far enough to move the portion of the paper written upon away from the opening 200, will raise the cover plate over the aperture and cause its retention there, as the block 214 resumes its normal position beneath the extension 213. It is intended that one of these individual voting devices shall be placed at the end of each row of candidates for the same office and in Fig. 1 I have shown one applied to the right-hand end of the top row of counters, and it is, of course, desirable that the other voting devices in the same row be locked or rendered inoperative the same way that the other regular push keys are locked when one of their number is actuated, and an arrangement for accomplishing this is shown in Fig. 23. In the top rows of counters shown, the interlocking devices between the keys are the sliding blocks described in my before mentioned patent, the last one of the regular series being indicated in Fig. 23 by 220, and on top of the casing of the irregular device is arranged the end sliding block 221 corresponding to the block 34 in Fig. 12, and between these two blocks 220 and 221 the end of the key is adapted to be inserted as with the other counter-actuating keys the manner of preventing the operation of more than one key in the row being to slide the blocks laterally and prevent the entrance of a second one, as understood by those skilled in the art. Though but one of these irregular devices is shown herein, it will be understood that any number could be employed and other interlocking devices between the keys of candidates for the same office could be used by slight modifications in construction.

In operation the voter enters the booth as before and if he desires to vote for any person not nominated for an office, he presses the key devoted to irregular candidates, shown in Figs. 19 and 20, this operation locking and preventing the operation of all the other keys in the row and causing the cover plate to move from the opening 200; then with a pencil he writes the name he wishes to vote on the paper exposed and leaves the booth. When he passes out of the exit door all the keys operated are released and among them the one on the irregular voting device, the operation of releasing, covering the aperture again, winding the paper forward and leaving the apparatus in condition for another voter, as will be understood. Though this irregular voting device is especially desirable in connection with a machine embodying mechanical counters, it is obvious that, if desired, it could be utilized in other connections, or by itself and the release or resetting could be caused by other means than that shown, viz: the connections with the booth door.

A hood M is arranged over an aperture N in the entrance door E of the booth inclined away from the partition B so that though persons outside of the booth can converse and give directions to the voter, being inside, it is impossible to see the voter or the ballot keys and thereby ascertain how he has voted.

The movable rack bar 60 is simply one form of connecting device between the ratchet wheels and having a determinate movement, to which the motions of the bars 43 are communicated, and I do not wish to be understood as confining myself to precisely this construction, though I prefer it, and in the claims mention it as a bar. Also that though in this construction the keys actuate the movable key bars 43 through the slides of the counters they could as well operate directly upon the pawls on said bars, but the construction and operation are much simplified by the present arrangement.

It will, of course, be understood that after the voting has been completed the total number of votes for the candidates can be readily and at once ascertained by an inspection of the counters in the chamber C, while the irregular candidates voted for and the number of their votes can be ascertained by removing the paper strip from the rollers, one or both of said rollers being removable for this purpose.

Various other modifications of the instrumentalities shown for carrying out my invention can be made without departing from the spirit of my invention and I therefore do not desire to be confined to precisely the arrangement herein shown.

I claim as my invention—

1. In a voting machine, the combination with two or more series of keys and two or more series of corresponding counters, of a progressively moving bar, a stop for arresting it after a predetermined movement, and two or more series-connecting devices actuated by any of the keys of a series and each operating independently on the movable bar, substantially as described.

2. In a voting machine, the combination with two or more series of ballot-indicating devices, as keys, and two or more movable bars, one for each series, actuated by the operation of the keys, of a progressively moving bar and connections between it and the bars actuated by the keys, and a stop for arresting the movement of said progressively moving bar, substantially as described.

3. In a voting machine, the combination with two or more series of ballot indicating devices, as keys, two or more movable bars, one for each series, actuated by the operation of the keys, and retaining devices for said keys, of a progressively moving bar, a stop for arresting it and ratchet connections between the key bars and the bar having the stop, whereby the last mentioned bar may be moved by any of the key bars, substantially as described.

4. In a voting machine, the combination with two or more series of ballot indicating devices as keys, two or more movable bars, one for each series, actuated by the keys, having a pawl thereon and retaining devices for the keys, of a progressively moving bar, a stop for arresting it, and ratchet connections connected to said bar with which the pawls on the key bars cooperate, substantially as described.

5. In a voting machine, the combination with two or more series of ballot indicating devices as keys, two or more movable bars, each having pawls thereon corresponding to the keys in the series, and a pawl actuating a stop device, of a movable bar, a stop for arresting it, and ratchet connections therewith actuated by the pawls on the key bars, substantially as described.

6. In a voting machine, the combination with two or more series of ballot indicating devices as keys, a series of movable bars having a series of pawls thereon corresponding to the keys in the series and a pawl actuating a stop device, of a movable rack bar, and a stop for arresting it, pinions engaging the bar and ratchet wheels connected to them with which the pawls on the bars cooperate, substantially as described.

7. In a voting machine, the combination with two or more series of ballot indicating devices as keys, a series of movable bars, having pawls thereon, counters having slides actuated by the keys and engaging the pawls on the bars, and the pawls on the bars engaging a stop device, of a movable rack bar and a stop for arresting it, pinions engaging the bar, and ratchet wheels connected to them with which the pawls on the bars cooperate, substantially as described.

8. In a voting machine, the combination with two or more series of ballot indicating devices as keys, a series of movable bars having a series of pawls thereon, of the movable rack bar and the stop for arresting it, pinions engaging the rack and ratchet wheels connected to them, pawls mounted on each of the movable bars and normally out of engagement with the ratchet wheels, but adapted to engage and rotate them when the movable bars are actuated, substantially as described.

9. In a voting machine the combination with a series of progressively movable bars, a series of ballot indicating keys operating on each bar retaining devices for the keys, a series of ratchet wheels and connections between them for causing their simultaneous operation and a stop for arresting them after a predetermined movement, of pawls on the movable bars engaging the ratchet wheels, substantially as described.

10. In a voting machine, the combination with a series of progressively movable bars and retaining devices therefor a series of ballot indicating keys for each bar, springs for retracting them and key retainers, a series of counters actuated by the keys, and a series of ratchet wheels, one for each bar connections between them for causing their simultaneous operation and a stop for arresting them after a predetermined movement, of pawls arranged on the bars adapted to engage the ratchet wheels and releasing devices for releasing the key retainers, substantially as described.

11. In a voting machine, the combination with a series of progressively movable bars, and retracting devices therefor, a series of ballot indicating keys operating on each bar, springs for retracting them and key retainers, a series of ratchet wheels connected for simultaneous operation, a stop for arresting them after a predetermined movement and a spring projection engaging one of the wheels for positioning them, of pawls arranged on the bars adapted to engage the ratchet wheels and releasing devices for releasing the key retainers and the spring projection, substantially as described.

12. In a voting machine, the combination with two or more movable bars having pawls thereon and adapted to be actuated by ballot indicating keys, of two or more ratchet wheels engaged by said pawls connected for simultaneous operation and a stop for arresting them after a predetermined movement, substantially as described.

13. In a voting machine, the combination with two or more series of ballot indicating keys, two or more movable bars, one for each series having pawls thereon, of two or more ratchet wheels arranged to be engaged by said pawls and connected for simultaneous operation and a stop for arresting them after a predetermined movement, substantially as described.

14. In a voting machine, the combination with two or more movable bars adapted to be actuated by ballot indicating keys, two or more ratchet wheels connected for simultaneous operation, and a stop for arresting them after a predetermined movement, of pawls arranged on the movable bars normally out of engagement with the wheels, but adapted when moved to engage and actuate said wheels, substantially as described.

15. In a voting machine, the combination with two or more series of ballot indicating keys, two or more movable bars, one for each series, springs for actuating said bars in one direction, and devices for retaining the bars when actuated against the spring, of two or more ratchet wheels connected for simultaneous operation, a stop for arresting them and pawls on the movable bars engaging the ratchet wheels and devices for releasing the retaining devices and allowing the bars to return to normal position, substantially as described.

16. In a voting machine, the combination with the movable bar adapted to be actuated by a ballot indicating key, of the pawl pivoted on the bar, a ratchet wheel adapted to be engaged by the pawl and a lug cooperating with the pawl holding it out of engagement when moved in one direction and permitting its engagement with and causing the actuation of the wheel when moved on the other direction, substantially as described.

17. In a voting machine, the combination with the movable bar adapted to be actuated by a ballot indicating key, of the pawl pivoted on the bar, having two projections, a ratchet wheel adapted to be engaged by the pawl, a stationary lug arranged to engage one or the other of the projections on the pawl depending on the position of the latter and retaining devices for holding the pawl in one of two positions, substantially as described.

18. In a voting machine, the combination with the movable bar adapted to be actuated by a ballot indicating key, of the pawl pivoted on the bar, and having a projection thereon, a ratchet wheel adapted to be engaged by the pawl, a stationary lug arranged to be engaged by the projection on the pawl when moved in one direction, thereby permitting only a limited motion of the bar and a retaining device for holding the pawl in this position, substantially as described.

19. In a voting machine, the combination with the movable bar adapted to be actuated by a ballot indicating key, of the pawl 47 pivoted on the bar having the projections 48 and 49 the ratchet wheel with which the pawl engages, the stationary lug 50 and the spring 53 cooperating with the pawl, substantially as described.

20. In a voting machine, the combination with the movable bar adapted to be actuated by a ballot indicating key and retaining devices for holding the bar when actuated, of the pawl 47 pivoted on the bar, the ratchet wheel with which it engages, the retaining spring 63 and the movable releasing bar 65, substantially as described.

21. In a voting machine, the combination with a ballot indicating key, a counter actuated thereby, and a movable bar operated by the movement of the key, of a locking device for preventing the movement of said bar when desired, substantially as described.

22. In a voting machine, the combination with a ballot indicating key located in a booth or chamber, a counter actuated thereby, and a movable bar operated by the movement of the key, of a locking device for cooperating with said bar and preventing its movement actuated from the exterior of the booth when desired, substantially as described.

23. In a voting machine, the combination with a series of ballot indicating keys, of a progressively moving bar actuated by the movement of any of the keys in the series, and a locking device for preventing the movement of said bar when desired, substantially as described.

24. In a voting machine, the combination with a booth or chamber and a series of ballot indicating keys actuated from the interior thereof, of a bar actuated by the movement of any of the keys in the series and having a projection thereon, a shaft having a hook adapted to cooperate with the projection and lock the bar when turned to one position and adapted to be operated from the exterior of the chamber, substantially as described.

25. In a voting machine, the combination with a booth or chamber, the series of ballot indicating keys located therein and the sliding blocks arranged between them, of the shaft extending to the exterior of the booth and having a projection for engaging one of the blocks and thereby preventing the operation of any key in the series, substantially as described.

26. In a voting machine, the combination with the plate or support having a series of apertures therein, a series of ballot indicating push keys on one side of the plate operating through said apertures and counters on the other side actuated thereby, of a bar sliding on the plate having a series of fingers or projections and means for moving said bar to bring the fingers in line with said apertures and prevent the operation of the keys when desired, substantially as described.

27. In a voting machine, the combination with the partition or support, the ballot indicating keys and counters actuated thereby, of the angular plate moving on the support having fingers or projections for cooperating with the keys, and the shaft having the eccentric portion for controlling said plate, substantially as described.

28. In a voting machine embodying a booth or chamber containing ballot indicating devices, the combination with the door, of a clock mechanism and connections between said door and clock, whereby the latter will be set when the door is closed, substantially as described.

29. In a voting machine embodying a booth or chamber containing ballot indicating devices, the combination with the door, of a clock mechanism having a movable hand and elastic connections between said door and hand whereby when the door is closed the hand will be returned to the starting point or zero, substantially as described.

30. In a voting machine embodying a booth or chamber containing ballot indicating devices, the combination with the door, of a clock having a movable hand, the lever actuated by the movement of the door and the elastic connections between the lever and hand, substantially as described.

31. In a voting machine, the combination with the booth or chamber having entrance and exit doors, of ballot indicating apparatus located in the booth and interlocking devices between the said entrance and exit doors whereby the former cannot be opened until the latter is closed, substantially as described.

32. In a voting machine, the combination with the booth or chamber having entrance and exit doors, ballot indicating apparatus located inside the booth and connected to the exit door so as to be reset or released when the door is moved, of a lock for securing the entrance door and connections between said exit door and the lock preventing the opening of the entrance door until the exit door is closed, substantially as described.

33. In a voting machine, the combination with the booth or chamber having entrance and exit doors, ballot indicating apparatus located inside the booth and connected to the exit door so as to be reset or released when the door is moved, of a spring bolt for securing the entrance door and connections between it and the exit door whereby said bolt is held retracted when the exit door is closed, substantially as described.

34. In a voting machine, the combination with a booth or chamber and ballot indicating devices located therein, of a curtain or cover for concealing said indicating devices operated from the exterior of the booth, substantially as described.

35. In a voting machine, the combination with a booth or chamber, and ballot indicating devices located therein, of a shaft capable of rotation from the exterior of the booth, a curtain connected thereto arranged to cover the ballot indicating devices, substantially as described.

36. In a voting machine, the combination with a series of counters, ballot indicating devices as keys for actuating them, and interlocking devices between the keys for preventing the operation of more than a predetermined number, of a cover plate for normally concealing a marking surface, as paper, an operating device as a key for removing the cover plate, said device being connected with the first mentioned interlocking devices between the ballot indicating keys, substantially as described.

37. In a voting machine, the combination with a series of counters, ballot indicating devices as keys for actuating them, retaining devices for the keys actuated, of a cover plate for normally concealing a marking surface as paper, an operating device as a key for removing said cover plate from the paper, a retaining device for engaging the key when actuated, interlocking devices between the key and the ballot indicating keys whereby only a predetermined number may be operated, releasing mechanism for releasing all of the keys and connections between it and the cover plate for restoring the latter to normal position, substantially as described.

38. In a voting machine, the combination with a series of counters, ballot indicating devices as keys for actuating them, retaining devices for the keys actuated, of a cover plate for normally concealing a marking surface as paper, a winding device or reel for moving the paper, an operating device as a key for removing said cover plate, a retainer engaging the key when actuated, interlocking devices between the key and the ballot indicating key whereby only a predetermined number may be operated, releasing mechanism for releasing all of the keys actuated, and connections between the releasing mechanism, the winding reel and the cover plate whereby the reel will be operated and the cover plate restored to normal position when the keys are released, substantially as described.

39. In a voting machine, the combination with the plate having an aperture therein, the paper support in rear of the aperture, the movable cover plate, the arm or extension connected to the cover plate and the movable support for said arm adapted to hold the cover plate over the aperture, of the movable key arranged when operated to remove the arm support, remove the cover plate from the aperture and become engaged with the arm, substantially as described.

40. In a voting machine, the combination with the plate having the aperture and the frame secured thereto having the paper support and the paper rolls journaled therein, of the two arms pivoted to said frame having the cover plate thereon, the extension on one of the arms adapted to engage a key, a support for the extension, a key adapted to engage and move the support and become engaged by the extension; substantially as described.

41. In a voting machine, the combination with the plate having the aperture, the paper support in rear of the aperture, the cover plate and the arm connected thereto, of the spring operated block adapted to support the arm on the plate, and the spring retracted key for moving the said block and becoming engaged with the arm, and resetting devices for raising the cover plate; substantially as described.

42. In a voting machine, the combination with the plate having an aperture therein, the paper support in rear of the aperture and the movable cover plate, of the key for removing the cover plate from the aperture, the retainer for holding the key when actuated connected to the cover plate, and the movable bar for returning the cover plate to normal position and releasing the key, substantially as described.

43. In a voting machine, the combination with the plate having an aperture, the paper support in rear of the aperture, the movable cover plate and rolls containing paper, one of them having a ratchet wheel thereon, of the movable key, the sliding block, the key retainer thereon connected to the cover plate, the pawl carried by the cover plate and the movable bar for resetting the cover plate, substantially as described.

44. In a voting machine, the combination with a series of ballot indicating keys, counters actuated thereby, and sliding blocks arranged between the keys, of a plate having an aperture therein, a cover plate normally covering the aperture, a key for removing said cover plate from the aperture and arranged to operate the blocks arranged between the other keys, substantially as described.

45. In a voting machine, the combination with the stationary key casing having the lug therein, of the ballot indicating push key movable in the casing having the solid inner end, the hollow body portion and the central recess, and the key-retracting spring located within the hollow body of the key and engaging the lug, substantially as described.

46. The ballot indicating key provided with the hollow body and the lugs thereon, in combination with the key casing the spring operating to project the key, and the spring washer surrounding the key and arranged between the lugs on the key and the casing for reducing the shock, substantially as described.

47. In a voting machine, the combination with the stationary key casing having the lug therein, provided with the longitudinal projection, of the ballot indicating push key having the solid inner end, the hollow body portion and the central recess, and the key retracting spring located within the hollow body of the key and engaging the lug, substantially as described.

48. In a voting machine, the combination with the ballot push key having the beveled end, of the counter embodying a casing having a slot in the top and at the front and rear a train of registering wheels, and a slide having a beveled end with which the key cooperates and the lateral lugs operating in the slots in the casing, substantially as described.

49. In a voting machine, the combination with a booth or chamber and a series of ballot indicating keys located therein, a movable bar having pawls thereon corresponding to the keys in the series, said pawls being operated upon immediately by the keys and a locking device for arresting the movable bar operated from the exterior of the booth, substantially as described.

JACOB H. MYERS.

Witnesses:
FRED F. CHURCH,
G. A. RODA.